(12) United States Patent
Lantz

(10) Patent No.: US 11,712,639 B2
(45) Date of Patent: Aug. 1, 2023

(54) EXTRACTION OF BOTANICAL MATERIAL USING HIGH-PRESSURE HYDROCARBONS

(71) Applicant: Illuminated Extractors Ltd., Fort Collins, CO (US)

(72) Inventor: Zachary Richard Lantz, Fort Collins, CO (US)

(73) Assignee: Illuminated Extractors Ltd., Fort Collins, CO (US)

( * ) Notice: Subject to any disclaimer, the term of this patent is extended or adjusted under 35 U.S.C. 154(b) by 0 days.

(21) Appl. No.: 18/078,650

(22) Filed: Dec. 9, 2022

(65) Prior Publication Data

US 2023/0107751 A1 Apr. 6, 2023

Related U.S. Application Data

(62) Division of application No. 16/867,431, filed on May 5, 2020, now Pat. No. 11,559,754.

(60) Provisional application No. 62/843,539, filed on May 5, 2019.

(51) Int. Cl.
*B01D 5/00* (2006.01)
*B01D 11/04* (2006.01)

(52) U.S. Cl.
CPC ........... *B01D 11/043* (2013.01); *B01D 5/003* (2013.01); *B01D 5/0051* (2013.01); *B01D 11/0434* (2013.01); *B01D 11/0484* (2013.01); *B01D 11/0492* (2013.01)

(58) Field of Classification Search
None
See application file for complete search history.

(56) References Cited

U.S. PATENT DOCUMENTS 5,516,923 A * 5/1996 Hebert ................ B01D 35/153
554/20

FOREIGN PATENT DOCUMENTS

CN 1017806 B * 8/1992
CN 101912696 A * 12/2010

OTHER PUBLICATIONS

CN-1017806-B machine translation—Qi K (Year: 1992).*
CN-101912696-A machine translation—Qi K (Year: 2010).*

* cited by examiner

*Primary Examiner* — Bradley R Spies
(74) *Attorney, Agent, or Firm* — Samuel M. Freund; Cochran Freund & Young LLC

(57) ABSTRACT

An apparatus and method for extraction of oils from botanical material using high-pressure hydrocarbons such as propane, or butane, or mixtures thereof are described. A high-pressure propane or butane saturated liquid/vapor mixture formed by pressure reduction through a valve placed before an extraction column, thereby serving as an expansion port was employed. The apparatus is capable of both continuous liquid extraction or batch-style liquid operation through the use of a manifold valve, which directs the solvent liquid/vapor in the system to either a supply tank or an extraction column.

7 Claims, 3 Drawing Sheets

| Approximate Vapor Pressure in psig |||||||||||
|---|---|---|---|---|---|---|---|---|---|---|
| Temperature || Propane → To → Butane |||||||||
| °F | °C | 100% | 95/5* | 80/20 | 70/30 | 60/40 | 50/50 | 40/60 | 30/70 | 20/80 | 100% |
| -40 | -40 | 1.5 | 1.4 | 1.2 | 1.1 | 0.9 | 0.8 | 0.6 | 0.5 | 0.3 | |
| -30 | -34.4 | 5.6 | 5.3 | 4.5 | 3.9 | 3.4 | 2.8 | 2.2 | 1.7 | 1.1 | |
| -20 | -28.9 | 10.7 | 10.2 | 8.6 | 7.5 | 6.4 | 5.4 | 4.3 | 3.2 | 2.1 | |
| -10 | -23.3 | 16.7 | 15.9 | 13.4 | 11.7 | 10 | 8.4 | 6.7 | 5 | 3.3 | |
| 0 | -17.8 | 23.5 | 22.3 | 18.8 | 16.5 | 14.1 | 11.8 | 9.4 | 7.1 | 4.7 | |
| 10 | -12.2 | 31.3 | 29.7 | 25 | 21.9 | 18.8 | 15.7 | 12.5 | 9.4 | 6.3 | |
| 20 | -6.7 | 40.8 | 38.8 | 32.6 | 28.6 | 24.5 | 20.4 | 16.3 | 12.2 | 8.2 | |
| 30 | -1.1 | 51.6 | 49 | 41.3 | 36.1 | 31 | 25.8 | 20.6 | 15.5 | 10.3 | |
| 40 | 4.4 | 63.5 | 60.3 | 51.2 | 45.2 | 39.2 | 33.2 | 27.1 | 21.1 | 15.1 | 3 |
| 50 | 10 | 77.1 | 73.6 | 63.4 | 56 | 49 | 42 | 35 | 28 | 20.9 | 6.9 |
| 60 | 15.6 | 92.4 | 88.4 | 76.2 | 68.2 | 60.1 | 52 | 43.9 | 35.8 | 27.8 | 11.6 |
| 70 | 21.1 | 109 | 105 | 90.8 | 81.6 | 72.3 | 63.1 | 53.9 | 44.6 | 35.4 | 16.9 |
| 80 | 26.7 | 128 | 123 | 107 | 96.5 | 86 | 75.5 | 65 | 54.5 | 43.9 | 22.9 |
| 90 | 32.2 | 149 | 143 | 125 | 113 | 101 | 89.4 | 77.5 | 65.6 | 53.6 | 29.8 |
| 100 | 37.8 | 172 | 165 | 145 | 132 | 118 | 105 | 91.3 | 77.9 | 64.4 | 37.5 |
| 110 | 43.3 | 197 | 189 | 167 | 152 | 137 | 122 | 106 | 91.4 | 76.3 | 46.1 |

* HD5, Commercial Grade Propane

F: 123.8 | C: 51.0 — 350 psi @ 100% P. | 350 psi @ 100% B.

Figure 3B

EXTRACTION OF BOTANICAL MATERIAL USING HIGH-PRESSURE HYDROCARBONS

CROSS-REFERENCE TO RELATED APPLICATIONS

The present application is a Divisional application of U.S. Non-Provisional patent application Ser. No. 16/867,431 for "Extraction of Botanical Material Using High-Pressure Hydrocarbons" by Zachary Richard Lantz, which was filed on May 5, 2020, which claims the benefit of Provisional Patent Application No. 62/843,539 for "Method For High Pressure Hydrocarbon Extraction Of Botanical Material" by Zachary Richard Lantz, which was filed on May 5, 2019, the entire contents of both applications are hereby specifically incorporated by reference herein for all that they disclose and teach.

BACKGROUND

As the cannabis concentrate market grows, marijuana producers are investing in extraction systems since concentrates command a higher price per item compared to flower (buds) and include a range of products. Hydrocarbon extraction is increasingly used to remove cannabinoids, terpenes, flavonoids, and other active cannabis compounds from the hemp or cannabis plants, and compared with other popular extraction solvents such as ethanol and carbon dioxide ($CO_2$), hydrocarbons (propane and butane) offer increased product quality and diversity.

Hydrocarbons are naturally-occurring compounds made up of hydrogen and carbon atoms and, of these, butane and propane are the most commonly used hydrocarbons for closed-loop extractions. Both are considered "light hydrocarbons" due to their low molecular weight, and a single solvent or a blend of propane and butane may be employed to produce unique consistencies and different ratios of cannabinoids from the plant material.

Butane is a non-polar solvent with a boiling point of 31.1° F., which enables lower temperatures to be used in purging the solvent without degrading volatile terpene compounds. Propane has a boiling point of −43.6° F., which makes it better for extracting some terpenes.

During the extraction run, hydrocarbon solvent is flushed over the plant matter into the material column. As the butane, propane, or blended mixture washes over the organic plant matter, the solvent is capable of dissolving cannabinoids, terpenes, flavonoids, phenolic amides, and sterols to create a full-spectrum extract. After the dissolution process, the solvent is separated from the solution and the oil is collected for further processing. The refined concentrate is stored in a collection vessel, the solvent removed by heating the vessel, and captured in a solvent storage tank for re-use. Closed-loop systems ensure the majority of the solvent is reclaimed.

SUMMARY

In accordance with the purposes of the present invention, as embodied and broadly described herein, an embodiment of the apparatus for extraction of oils from botanical material using a hydrocarbon solvent having a chosen pressure and a selected temperature, hereof, includes: an extraction column having a first closed end, a second closed end, and an interior volume, for containing the botanical material; a first valve in fluid communication with the volume and disposed at the first end of the extraction column for receiving the hydrocarbon solvent, the first valve being adjustable such that the chosen pressure of the hydrocarbon solvent is reduced and the selected temperature of the hydrocarbon solvent is reduced by expansion of the hydrocarbon solvent through the first valve, forming thereby a saturated liquid-vapor mixture of the hydrocarbon solvent; a second valve in fluid communication with the volume and disposed at the second end of the extraction column for receiving the saturated liquid-vapor mixture of the hydrocarbon solvent after the saturated liquid-vapor mixture of said hydrocarbon solvent has passed through the botanical material, forming thereby a saturated liquid-vapor mixture of the hydrocarbon solvent containing extracted botanical material; an extraction basin in fluid communication with the second valve for receiving the saturated liquid-vapor mixture of the hydrocarbon solvent containing extracted botanical material; a heater for providing heat to the extraction basin in order to boil off the hydrocarbon solvent from the saturated liquid-vapor mixture of the hydrocarbon solvent containing extracted botanical material, leaving extracted oils from the botanical material in the extraction basin; a recovery pump for compressing the hydrocarbon solvent after the hydrocarbon solvent is boiled off from the extraction basin; a third valve in fluid communication with the extraction basin and in fluid communication with the recovery pump; a condenser for cooling the compressed hydrocarbon solvent; a hydrocarbon solvent storage tank; and a manifold valve for directing the cooled, compressed hydrocarbon solvent into the first valve or the hydrocarbon solvent storage tank.

In another aspect of the present invention and in accordance with its purposes, as embodied and broadly described herein, an embodiment of the method for extraction of oils from botanical material using a hydrocarbon solvent having a pressure and a temperature, hereof, includes: reducing the pressure and cooling the hydrocarbon solvent such that a saturated liquid-vapor mixture thereof is formed; contacting the botanical material with a saturated liquid-vapor mixture of the hydrocarbon solvent forming thereby a saturated liquid-vapor mixture of the hydrocarbon solvent containing extracted botanical material; boiling off the hydrocarbon solvent from the saturated liquid-vapor mixture of the hydrocarbon solvent containing extracted botanical material, leaving extracted oils from the botanical material; compressing the boiled off hydrocarbon solvent; cooling the compressed hydrocarbon solvent; and directing the cooled, compressed hydrocarbon solvent to a hydrocarbon storage tank therefor, or reducing the pressure and cooling the cooled, compressed hydrocarbon solvent such that a saturated liquid-vapor mixture thereof is formed.

Benefits and advantages of the present invention include, but are not limited to, providing an apparatus and method for extraction of oils from botanical material using high-pressure hydrocarbons such as propane, or butane, or mixtures thereof, whereby solvent channeling is eliminated, impurity content in final product is minimized, efficiency of extraction of the solvents is increased, and no liquid nitrogen is required for fresh frozen plant extraction.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3A is a schematic representation of an embodiment of the apparatus for high-pressure hydrocarbon extraction of botanic materials, while FIG. 3B is a chart of the vapor pressures for propane and butane as a function of temperature between 100% propane and 100% butane and mixtures thereof.

DETAILED DESCRIPTION OF THE INVENTION

Figure 1:
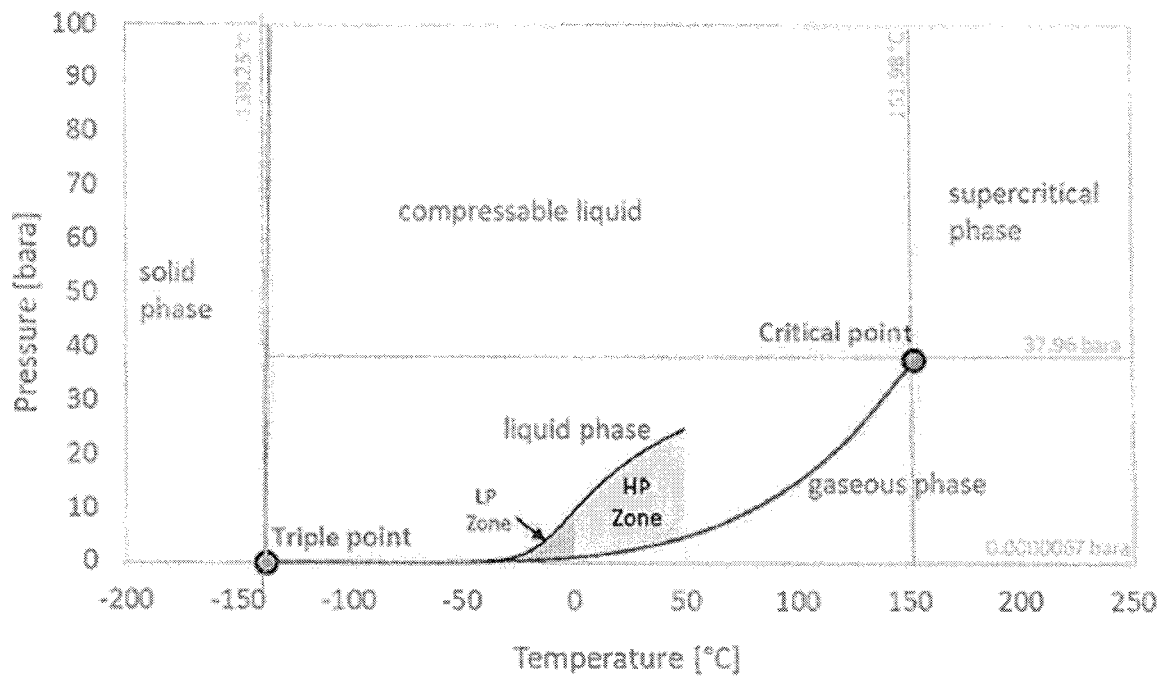
FIG. 1 is a is a phase diagram for butane illustrating pressure in bara as a function of temperature in degrees centigrade.

Briefly, embodiments of the present invention include an apparatus and method for extraction of oils (including cannabinoids, terpenes, flavonoids, phenolic amides, and sterols, as examples) from botanical material using high-pressure hydrocarbons such as propane, or butane, or mixtures thereof. A high-pressure propane or butane saturated liquid/vapor mixture formed by pressure reduction through a valve placed before an extraction column, thereby serving as an expansion port was employed. A pressure drop From 100 psi to 80 psi was found to convert about 20 psi from liquid to vapor, and absorb sufficient heat from its environment to cool the remaining 80 psi upon injection.

The apparatus is capable of both continuous liquid extraction or batch-style liquid operation through the use of a manifold valve, which directs the solvent liquid/vapor in the system to either a supply tank or an extraction column. The present invention also allows phase transition control of the hot discharge vapor from a recovery pump, which enables injection liquid/vapor temperature control for continuous operation.

Current methods for extracting oil from oil-bearing plants include passing a liquid solvent through the botanical material initially under vacuum such that air is removed, then collecting the product-laden solvent in a collection basin to which heat is applied in order to remove the solvent from the product for recovery by boiling. External heat may be applied to the extraction column using a heating jacket to purge remaining solvent from the botanical material into the recovery system. Both passive operation (using hot water and ice) to perform phase transitions or active operation (using a recovery pump to recompress the gas into phase transition) are typical modes of operation for the previous art.

One difficulty involved with previous methods is known as "Solvent Channeling", a condition in which the solvent forms tight channels within the product column that result in poor extraction of the product away from the channel of solvent. Another problem for passive operation is the need to fill and move cumbersome and heavy solvent tanks. Additional heating and cooling capacity are also required to transfer fluids from tank to tank. Further, passive operation is much slower than active operation due to wait times for thermodynamic equilibrium. For cold liquid solvent injection used to enable cold liquid solvent injection into the extraction column, chilling the supply tank can cause any water in the system to turn into ice which can block the supply tube and clog the system. Cold extraction typically helps to keep fats, waxes, lipids, and other non-desirable materials behind and within the plant material.

The present invention can be better understood by likening it to a refrigeration system that has been redesigned into an extraction system as a result of several modifications. An injection valve replaces the expansion valve of the refrigeration system, and a removable botanical material extraction column with a recovery basin for removing the extracted product from the solvent, before returning to the compressor, valve, both to be described in more detail below, replacing the evaporator coil of the refrigeration system. R290 Propane, R600 Butane, and R600a Isobutane are all refrigerants commonly used in refrigeration systems that are also standard hydrocarbon extraction solvents found in the botanical material extraction industry, and some food processing industries.

As the refrigeration cycle predicts, the quality of the gas at the expansion valve consists on average of between 75% to 88% liquid. Unless the biomass is being chilled by an external jacket, then it will likely be at room temperature (25 C). When compared to 50 psi propane (−10 C) the biomass would serve instead as a source of heat and boil off more solvent. The addition of a condenser can liquify all the vapor producing a subcooled liquid that can be compressed above the expected temperature/pressure relationship seen with a gas/liquid mixture or a pure vapor. Once in this state, the compressed subcooled liquid can be directed to all spaces within the column to where atomization is not necessary. For the liquid/vapor mixture of the present invention (not sub-cooled liquid), compression above 120 psi forces a phase change between gas and liquid as more molecules are compressed much closer together condense within the biomass in hard-to-reach spaces such as the upper corners, thus eliminating the need for atomization.

Embodiments of the present invention permit operation of a botanical extraction apparatus at a higher pressure, while maintaining a low extraction temperature by utilizing the subcooling effect from a condenser, if needed, and can also exploit an injection valve acting as an expansion valve to further reduce the injecting solvent temperature by boiling a small portion of liquid to absorb heat from the remaining liquid, thereby and cool it by auto-refrigeration. As a liquid-vapor mixture the present solvent takes on properties that would otherwise not be experienced in an extraction using a pure liquid.

First, once above 120 psi, anywhere there is pressure there is solvent, which eliminates solvent channeling since the liquid takes the path of least resistance as it flows to the bottom of an extraction column.

Second, being a mixture of liquid and vapor, the solvent takes on a fog-like state which has smaller solvent molecules performing the extraction process, instead of large groups as seen with a large volume liquid. The solvent then has lower holding capacity due to lower physical surface area per molecule, whereby the solvent saturates with the most soluble products first; that is, short chain molecules/non-polar molecules, such as terpenes and cannabinoids, before absorbing the larger chain molecules such as fats and waxes. This minimizes impurity content in final product.

Third, once cannabinoids are liquefied by the solvent, the cycling action of the compressor moving solvent through the extraction column at a moderate speed and pressure, physically extracts the liquid molecules, thereby increasing the efficiency of extraction of the present solvents.

Additionally, sub-cooled solvent, by itself, is typically less capable of carrying a solute than a warm solvent and therefore more solvent will be needed to perform the same extraction while producing an overall purer product. Cold solvent is also required for fresh frozen plant extraction in order to keep the biomass frozen during the extraction process, in order to prevent impurities from entering the solvent stream. Traditionally this was performed with liquid nitrogen injection, thereby creating a new problem in that the nitrogen must be separated from the solvent before compressing the solvent into the tank in order to prevent overpressure issues. The need for nitrogen is eliminated in embodiments of the present apparatus by subcooling the solvent in the condenser and by additional auto-refrigeration at the injection/expansion valve of the extraction column.

Figure 2:
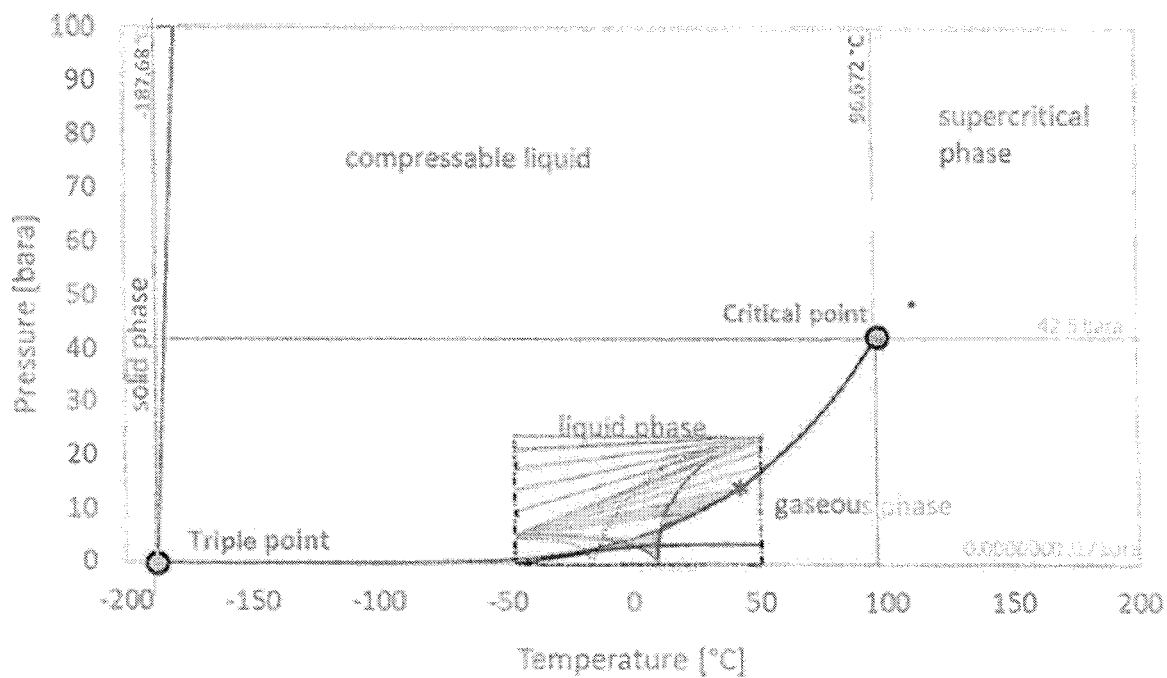
FIG. 2 is a phase diagram for propane illustrating pressure in bara as a function of temperature in degrees centigrade.

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning to FIGS. 1 and 2, illustrated are phase diagrams for butane and propane, respectively, illustrating pressure in bara as a function of temperature in degrees centigrade. Additional data (nitrogen injection range) can be applied to both phase diagrams. This zone can be achieved without using nitrogen as in traditional processing, by subcooling the extraction solvent prior to injection while creating a high-pressure zone with the extraction drain valve mostly closed. Low-pressure liquid versus a high-pressure cycle are indicated on these diagrams as room temperature and pre-chilled liquid, without additional head pressure.

Figure 3A:
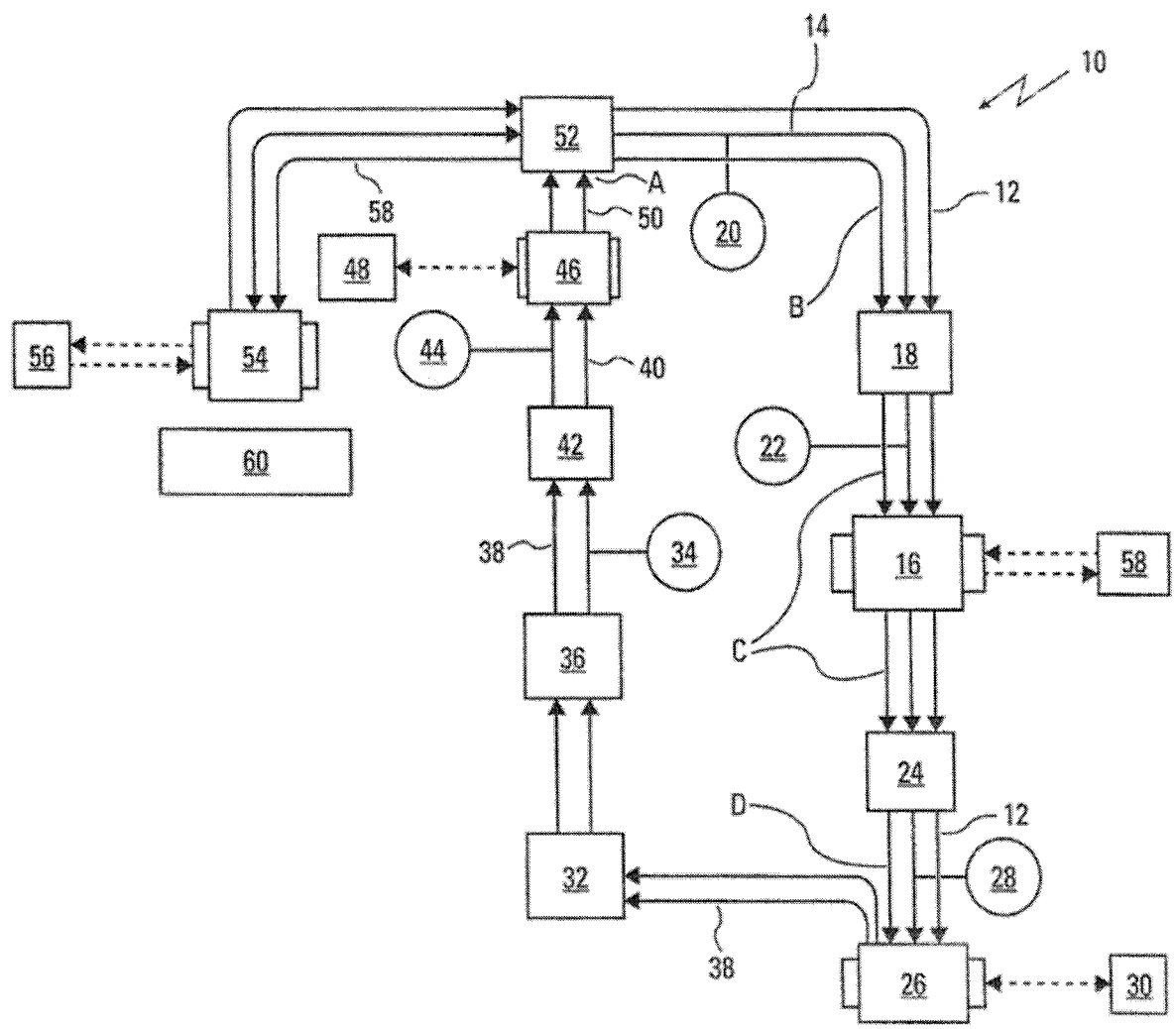

FIG. 3A is a schematic representation of an embodiment of apparatus, 10, for high-pressure hydrocarbon extraction of botanic materials, while FIG. 3B is a chart of the vapor pressures for propane and butane as a function of temperature between 100% propane and 100% butane and mixtures thereof. These values are used when determining the current mixture ratio and to determine if there is atmosphere pressure in the supply tank. It can also be used to obtain an approximate butane phase diagram based on the propane phase diagram, because they are very similar gases, and their enthalpy and entropy values will approximately follow the same drop as seen in the chart. Such analysis is only valid for saturated liquid-vapor mixture or for pure vapor, as the pure liquid may be compressed and give incorrect values.

Turning to FIG. 3A, liquid propane gas (LPG) solvent, 12, following general flow direction, 14, is directed into extraction column, 16, through valve, 18, which is adjusted to provide a pressure drop, as measured between pressure gauges, 20 and 22. Solvent 12 is thereby cooled a few degrees as it enters extraction column 16. Valve, 24, controls the ability to soak or to pressurize extraction column 16 above that of extraction basin, 26, as measured by pressure gauge, 28. Once in extraction basin 26, heat from heater, 30, is applied to boil LPG 12, now containing extracted botanic material from extraction column 16. Valve, 32, is adjusted so that there is a pressure difference between extraction basin 26 pressure gauge 28 and pressure gauge, 34, for oil separator, 36, of at least 10 psi, preferably greater than 25 psi, and most preferably greater than 50 psi. The pressure drop forces extracted product to remain in extraction basin 26 while the propane or butane gas, 38, continues into oil separator 36. From here, the gas is compressed, 40, by recovery pump, 42, to a pressure measured by pressure gauge, 44, and sent into variable temperature condenser, 46, having its temperature controlled by chiller, 48. This allows LPG, 50, temperature returning through manifold valve, 52, to be maintained without experiencing over-heating. If LPG 50 becomes too hot, it must be re-compressed into supply tank, 54, and fresh liquid withdrawn. The temperature of supply tank 54 is controlled by heater/chiller, 56. Inline condenser 46 following recovery pump 42 permits the control of the maximum temperature of the returning gas so as to stay within the required extraction pressure window. From condenser 46, LPG 50 returns to control manifold valve 52 where its direction, 58, can either be into supply tank 54 or 12 to the extraction system as a high-pressure solvent.

For use with propane, a pump inlet pressure greater than 15 psi, preferably greater than 25 psi, and most preferably within the range of 30-50 psi inlet pressure to pump 42. This provides a sufficiently high gas density for extraction with a solvent quality in the range between 40% and 80% liquid at expansion valve 18. Typical pump outlet pressures range between 50 psi and 150 psi for extraction, and between 150 psi and 250 psi for high-pressure cycle condenser bypass. With butane, a pump inlet pressure greater than 5 psi, preferably greater than 10 psi and most preferably within the range between 16 and 25 psi inlet pressure, with typical pump outlet pressures ranging between 15 psi and 65 psi for extraction, and between 65 psi and 120 psi for high-pressure cycle condenser bypass.

A pump inlet pressure of or less than 10 psi, more preferably 5 psi, and most preferably between 0 and 2 psi pump inlet pressure performs oppositely, and forces the exhaust solvent to become too hot to return to its liquid state without removing a large amount of heat, which is achieved by bypassing heat exchanger 46. Once heat exchanger 46 is bypassed, all heat generated by pump 42 is added to the solvent vapor, and carried by the vapor into extraction column 16 to boil off remaining solvent trapped in the biomass.

Temperature zones A, B, C, and D in FIG. 3A are controlled by adjusting the pressure ratios on both sides of manifold valve 52, valve 18, valve 24, and valve 32, with 0 to 20+ psi between pressure gauge 44 (higher) and pressure gauge 20, 0 to 30+ psi pressure difference between pressure gauge 20 (higher) and pressure gauge 22, and 50+ psi pressure difference between pressure gauge 34 (lower) and pressure gauge 28.

As pressure increases, solubility decreases, while at the same time, as temperature increases solubility increases. With gaseous solvents, increase of pressure typically results in an increase in temperature, just as a decrease in pressure results in a decrease in temperature. Just as an increase in pressure will increase the density, to an extent, which also alters solubility, a decrease in pressure reduces the amount of solvent molecules which makes the solvent no longer capable of carrying an extracted product due to density loss. This is relative in that as pressure/temperature increases, the quality of the liquid also changes from approximately 85% liquid to lower than 15% liquid. Only a sub-cooled liquid can experience an increase in pressure without an increase in temperature. Due to this a window in which the gas remains at a liquid quality viable for extraction has been found under specific conditions.

As temperature increases, solubility will also increase. This is experienced at approximately 220 psi in that the curve takes on an exponential rate compared to previous state. At this point the gas will want to become more vapor than liquid, but also the temperature increase changes from about (1 deg/psi) to (5-10 deg/psi). At this point more impurities will start to be extracted as the solvent density decreases due to increased temperature. At pressures under 220 psi, the solvent does not gain more heat than pressure and instead remains closer to 1:1, while remaining more liquid than vapor. Thus, low-pressure vapor-liquid will have higher liquid density due to quality when it is at a lower pressure than at a higher pressure with the correct pressure at the compressor, and there be a higher percentage of liquid available for solvation at lower pressure—until below a specific temperature where solvent solubility becomes important and specific products will no longer be soluble.

These known physical attributes of gaseous solvent extraction, within a specific window, are used to generate a saturated liquid-vapor mixture, which is neither gas or liquid, but contains both at the same time. The liquid-to-gas ratio can be controlled by maintaining a specific range of pressure/temperature during extraction, whereby traditional problems such as solvent channeling and low yields are eliminated.

Traditional methods of extraction utilize pure liquid from the supply tank with no vapor present, nor is there a return of vapor/liquid from the compressor to the extraction system without first returning to the supply tank. In accordance with the teachings of embodiments of the present invention, the apparatus removes the need for a supply tank during the extraction process, and the need for a large volume of solvent to be stored on site. That is, in the present process, the hot gas from the compressor, perhaps slightly cooled in the condenser, is directed into the extraction column without going through the supply tank. This allows the use of the heat generated from the process to return to the column as a hot vapor (no liquid due to low compressor inlet pressure and bypassing the condenser and supply tank) which then boils the remaining thermally locked-out solvent from the extraction column. This process is much more rapid than using a heater and can be performed with non-jacketed columns. Once the column reaches the desired temperature, then full recovery can be performed after which the extraction column is purged using the compressor and the condenser and the solvent is then returned to the supply tank.

Ordinarily, a solvent to biomass ratio of between 1:5 and 1:10 is desired. With usual extraction apparatus, this would require the ability to have on site up to 1500 lbs. of solvent in the extraction room (1:10). However, by using the present apparatus, the extraction process can be performed with about 50 lbs. of solvent on average within the system. It takes about 2 min. to pass 60 lbs. of solvent through the column. As for solvent channeling, once the pressure is above 120 psi and below 220 psi the solvent density within extraction column 16 is within the window to which any space at this pressure will be also at a liquid state.

High-pressure hydrocarbon extraction enables one to extract a higher yield per unit of solvent with a lower impurity content due to modified solvent properties. The high-pressure environment enables the most soluble product to rapidly saturate the solvent, while the least soluble products remain in the biomass material. However, the flow solvent may extract some undesirable products while the solvent cycles across the biomass. Extracted cannabinoid content is typically between 50% and 75% of the total cannabinoids. This range reflects cannabinoid ratio of the input material, a low cannabinoid content can cause final product to also have a lower overall cannabinoid content. High cannabinoid content crude enables the production of previously impossible to make products such as Cannabidiol-Acid (CBD-a), which is known to be the highest anti-inflammatory of all cannabinoids.

During high-pressure hydrocarbon extraction, continuous solvent extraction is being performed on the product loaded into extraction column 16. Solvent 12 is not returned to supply tank 54 from recovery pump 42, but instead first sent to a variable temperature condenser 46, then into vapor control manifold 52, to which then returns to extraction column 16 through valve 18—depressurization point. Variable temperature condenser 46 is set to a point so that the exhaust gas is at a pre-determined pressure as desired for the extraction. This allows for continuous, non-stop high-pressure hydrocarbon extraction of the product at a set temperature/pressure relationship. With a bypass system or manifold to allow gas to cycle without entering extraction column 16, the system does not need to recover the gas until the end of the processing day. Only adding solvent to the system throughout the day due to losses will be necessary to maintain operating conditions.

Heating extraction column 16 during the extraction cycle and/or at the end of the final cycle, using heater/chiller, 58, increases the final recovery rate which increases extraction efficiency. The present apparatus permits the condenser to be bypassed, thereby allowing all the heat generated by the low inlet pressure to the compressor, which compresses the solvent to a high outlet pressure, thus adding heat to the solvent as it is compressed in relation to the amount of differential it is being compressed. This then forces the remaining liquid in the extraction columns to be vaporized, at which point is much easier to recover with the compressor than as a liquid that is thermally locked out (too cold to boil at current conditions). That is, the heat generated by the compressor becomes the source of heat to boil remaining solvent in the extraction columns, once the condenser is bypassed. The process of solvent recovery expends the most time during the extraction process. Latent solvent in the product loaded into extraction column 16 can become "locked-up" within the system due to boiling under vacuum until below its boiling point. Column heat addition accelerates the removal of this latent solvent and minimizes recovery times.

As seen with the Phase diagrams in FIGS. 1 and 2, simple adjustments to the pressure/temperature relationship will force the solvent to transition between gaseous or liquid state. With this knowledge and Valves 18, 24, and 32, the injection temperature and liquid/gas ratio can be controlled by adjusting each valve to produce the required pressure differential between zones. Thus, the injection valve (expansion valve) is used as a thermal controller based on expansion of gas from the supply manifold to the extraction column to the basin to the compressor. Various zones require adjustment of valving during the extraction process due to environment changes—such as when the basin pressure increases, the flow into the compressor will need to be adjusted to maintain set input.

At the end of the day or at the end of the extraction cycle, the solvent gas may be recovered into supply tank 54 by means of control manifold 52. Supply tank 54 may be placed in ice water, 60, or be jacketed or have an internal cooling coil controlled by heater/chiller 56 to aid in the condensation of the solvent and speed the recovery cycle. However, the only time the supply tank needs to be operationally connected to the extraction system is during the initial solvent injection—at the beginning of the day, and sequentially topped off as needed throughout the day to maintain solvent density within the system.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for extraction of oils from botanical material using a hydrocarbon solvent having a pressure and a temperature, comprising:
   reducing the pressure and cooling said hydrocarbon solvent such that a saturated liquid-vapor mixture thereof is formed;
   contacting said botanical material with a saturated liquid-vapor mixture of said hydrocarbon solvent forming thereby a saturated liquid-vapor mixture of said hydrocarbon solvent containing extracted botanical material;
   boiling off said hydrocarbon solvent from said saturated liquid-vapor mixture of said hydrocarbon solvent containing extracted botanical material, leaving extracted oils from said botanical material;
   compressing said boiled off hydrocarbon solvent;
   cooling said compressed hydrocarbon solvent; and
   directing said cooled, compressed hydrocarbon solvent to a hydrocarbon solvent storage tank therefor, or reducing the pressure and cooling said cooled, compressed hydrocarbon solvent such that a saturated liquid-vapor mixture thereof is formed.

2. The method of claim 1, wherein said hydrocarbon solvent is chosen from propane, butane and mixtures thereof.

3. The method of claim 1, further comprising the step of removing extracted botanical material from said hydrocarbon solvent, before said step of compressing said boiled off hydrocarbon solvent.

4. The method of claim 2, wherein for propane said step of compressing said boiled off hydrocarbon solvent changes the pressure of said boiled off hydrocarbon solvent from between 15 psi and 50 psi to between 50 psi and 150 psi.

5. The method of claim 4, wherein for propane said hydrocarbon solvent comprises between 40% and 80% liquid propane after said step of reducing the pressure and cooling said hydrocarbon solvent.

6. The method of claim 1, wherein continuous extraction of oils from botanical material occurs after reducing the pressure and cooling said cooled, compressed hydrocarbon solvent such that a saturated liquid-vapor mixture thereof is formed.

7. The method of claim 1, wherein said oils comprise cannabinoids, terpenes, flavonoids, phenolic amides, and sterols.

* * * * *